United States Patent [19]

Schröter

[11] 4,350,438

[45] Sep. 21, 1982

[54] LIGHT DOSING DEVICE

[75] Inventor: Herbert Schröter, Taunusstein, Fed. Rep. of Germany

[73] Assignee: Hoechst Aktiengesellschaft, Frankfurt am Main, Fed. Rep. of Germany

[21] Appl. No.: 801,734

[22] Filed: May 31, 1977

[30] Foreign Application Priority Data

Jun. 3, 1976 [DE] Fed. Rep. of Germany ....... 2624866

[51] Int. Cl.$^3$ ............................................... G03B 27/72
[52] U.S. Cl. .......................................... 355/68; 355/83
[58] Field of Search ..................... 355/38, 68, 69, 71, 355/83

[56] References Cited

U.S. PATENT DOCUMENTS

| 1,973,512 | 9/1934 | Smith | 355/83 |
| 3,222,983 | 12/1965 | Ouchi | 355/68 |
| 4,017,180 | 4/1977 | Yen et al. | 355/68 |

FOREIGN PATENT DOCUMENTS

| 2246618 | 3/1973 | Fed. Rep. of Germany | 355/68 |
| 344900 | 3/1931 | United Kingdom . | |
| 1040601 | 9/1966 | United Kingdom | 355/68 |
| 1086300 | 10/1967 | United Kingdom . | |
| 1150117 | 4/1969 | United Kingdom | 355/68 |
| 1164794 | 9/1969 | United Kingdom . | |
| 1362941 | 8/1974 | United Kingdom . | |
| 1402336 | 8/1975 | United Kingdom . | |
| 1332318 | 10/1979 | United Kingdom . | |

Primary Examiner—L. T. Hix
Assistant Examiner—W. J. Brady
Attorney, Agent, or Firm—Schwartz, Jeffery, Schwaab, Mack, Blumenthal & Koch

[57] ABSTRACT

Disclosed is a device for dosing light from a light source in accordance with the intensity of light impinging upon a material to be exposed, comprising: a photosensitive element located in the beam path of the light source, comprising a photoresistor having an ohmic resistance inversely proportional to the intensity of light impinging thereon and providing an output voltage; a capacitor arranged in series with the photosensitive element; means, preferably in the form of a switch bridging the capacitor, responsive to switching-on of the light source for initiating charging of the capacitor; switching means arranged in series with said capacitor for varying the charging time thereof, whereby the exposure time of said material to be exposed can be varied by a predetermined ratio to produce a desired shade of gray; optional means for amplifying the output voltage of the photosensitive element; means for comparing the output voltage of the photosensitive element with a reference voltage to produce an output signal; and means for controlling the amount of light impinging upon the material to be exposed in response to the output signal from the comparing means.

4 Claims, 4 Drawing Figures

LIGHT DOSING DEVICE

BACKGROUND OF THE INVENTION

The present invention relates to a light dosing device comprising a photosensitive element which is subjected to the light flux emitted by a source of light and which either controls the open-time of a diaphragm disposed in the beam path between the source of light and the element or the on-time of the source of light, according to the intensity of the light impinging upon a material to be exposed. The device further comprises an amplifier for amplifying the output voltage of the element and a comparing unit for comparing the amplified output voltage to a reference voltage.

When exposing photosensitive materials, e.g., printing plates, the exposure time is generally chosen in accordance with the characteristics of the material to be exposed by integrating the voltage directly or indirectly supplied by a photosensitive element. For this purpose, a saw-tooth is generated the slope of which changes as a function of voltage. For extended exposure times, a number of saw teeth are obtained. It may be empirically determined, for example, how many of these saw teeth are required for proper exposure of a particular type of material. This number is then preset in a light dosing device. Depending upon the light intensity, the photosensitive element supplies a more or less high voltage which, when integrated, results in saw teeth of different lengths and thus in exposure times of varying lengths with an unchanging number of teeth.

The principle of integrating voltage values is known from German Offenlegungsschrift No. 2,046,887 which refers to a photographic copying machine in which changes in the light intensity of the source of light are accounted for in the exposure time. This known equipment is provided with an electrical timer having an adjustable delay controlled by a photoelectric transducer in accordance with the light intensity measured at the original to be copied. The timer comprises a potentiometer for a direct voltage corresponding to the preset delay. The direct voltage is time-integrated by an amplifier and is compared to a reference voltage by means of a comparing unit which emits a control signal as soon as a particular voltage difference is attained. In this equipment, the light flux from the source of light is integrated and its changes are accounted for in the exposure time; however, the equipment is not adapted to use different reference voltages for materials of different sensitivities and to obtain a control signal for actuating the source of light or a diaphragm by comparing the integrated direct voltage of the source of light to a reference voltage without forming a voltage difference.

SUMMARY OF THE INVENTION

It is therefore an object of the invention to provide an improved light dosing device.

A specific object of the invention resides in providing a light dosing device which maintains a constant product of light flux and exposure time and thus stabilizes the quantity of light impinging upon a material, irrespective of changes due to aging of the source of light irradiating the material and independent of the distance between the source of light and the material as well as of variations in voltage supply of the source of light.

In accomplishing the foregoing objects, there has been provided in accordance with the present invention a device for dosing light from a light source in accordance with the intensity of light impinging upon a material to be exposed, comprising: a photosensitive element located in the beam path of the light source, comprising a photoresistor having an ohmic resistance inversely proportional to the intensity of light impinging thereon and providing an output voltage; a capacitor arranged in series with the photosensitive element; means, preferably in the form of a switch bridging the capacitor, responsive to the switching-on of the light source for initiating charging of the capacitor; switching means arranged in series with said capacitor for varying the charging time thereof, whereby the exposure time of said material to be exposed can be varied by a predetermined ratio to produce a desired shade of gray; optional means for amplifying the output voltage of the photoelectric element; means for comparing the output voltage of the photosensitive element with a reference voltage to produce an output signal; and means for controlling the amount of light impinging upon the material to be exposed in response to the output signal from the comparing means.

In one embodiment, the light amount control means comprises means for controlling the length of time for which the light source is on, whereas in another embodiment, this means comprises a diaphragm positioned between the light source and the material to be exposed and means for opening and closing the diaphragm in response to the output signal.

Further objects, features and advantages of the invention will become apparent from the following detailed description of preferred embodiments, when considered in light of the accompanying sheets of drawings.

DETAILED DESCRIPTION OF PREFERRED EMBODIMENTS

According to the invention a photoresistor is used as a photosensitive element, the ohmic resistance of which is inversely proportional to the light intensity of the source of light. Further, a capacitor bridged by a first switch is arranged in series with the photosensitive element and starts to be charged when the source of light is switched on.

The invention yields the advantages, first that circuit complexity is reduced as compared to known equipment, which results in a reduction in the cost of manufacture, and secondly, that by transition from the known digital technique to the analogue technique, time-integration of saw teeth is no longer necessary. Instead, the capacitor voltage is compared to a given voltage in the comparing unit and as soon as the two voltage values are equal, the comparing unit supplies a switching or control signal to the diaphragm or to the source of light.

Figure 1A:
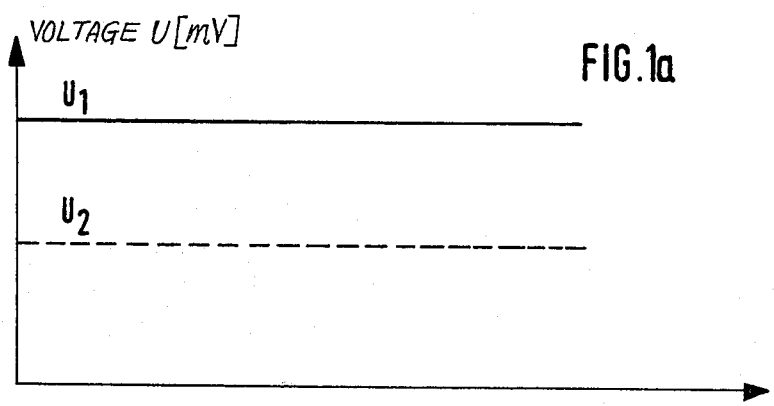
FIGS. 1a and 1b illustrate graphical plots of voltage corresponding to the light intensity of the source of light versus time, for a known device.
Figure 1B:
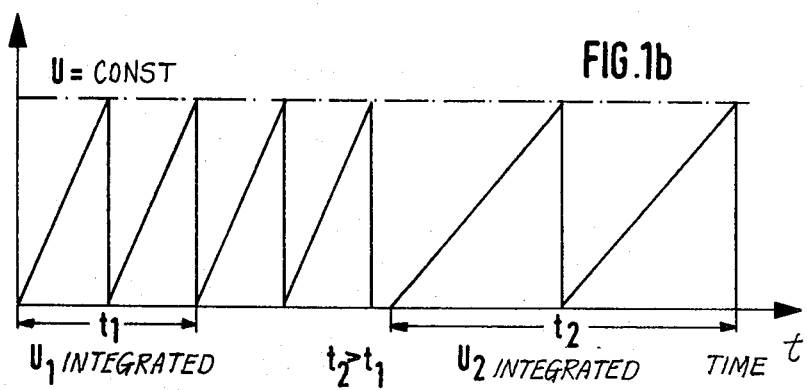

Referring now to the drawings, in a known light dosing device the photosensitive element supplies a more or less high voltage $U_1$ or $U_2$, as plotted in FIG. 1a. This voltage is normally amplified and subsequently integrated, e.g., by generating a saw tooth the slope of which changes as a function of voltage. For extended exposure times a number of saw teeth are generated. In practice, it is empirically determined how many of these saw teeth are required for proper exposure of a particular material. This number is then preset in the light dosing device. The different voltages $U_1$ and $U_2$ result in saw teeth of different lengths and thus in exposure times of varying duration for a constant number of teeth, as shown in FIG. 1b.

Figure 2:
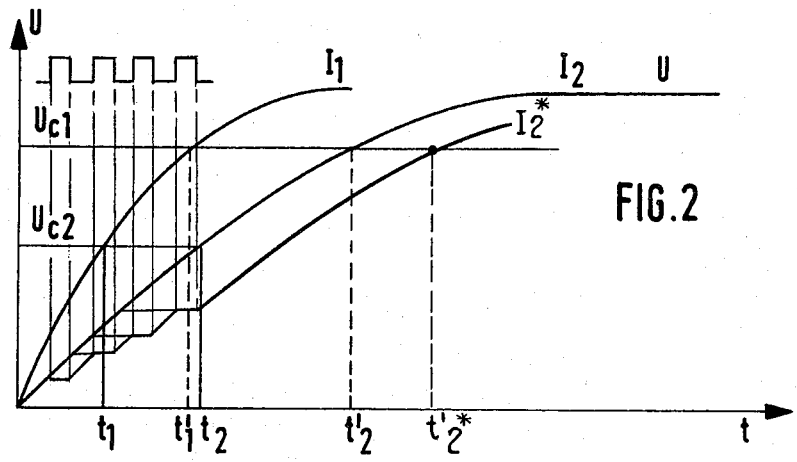
FIG. 2 illustrates a plot of the potential gradient for two intensities of the source of light in the device according to the invention, together with two reference voltages corresponding to two different materials with different sensitivities.

In contrast, FIG. 2 shows the potential gradient for two light intensities $I_1$ and $I_2$ of a source of light 30 (FIG. 3) in a light dosing device 10; $Uc_1$ and $Uc_2$ are two reference voltages corresponding to two materials with different sensitivities. The reference voltages $Uc_1$ and $Uc_2$ are explained below. This figure also shows the potential gradient $I_2^*$ which is produced by the use of a triggered switching element 36, as hereinafter described.

Figure 3:
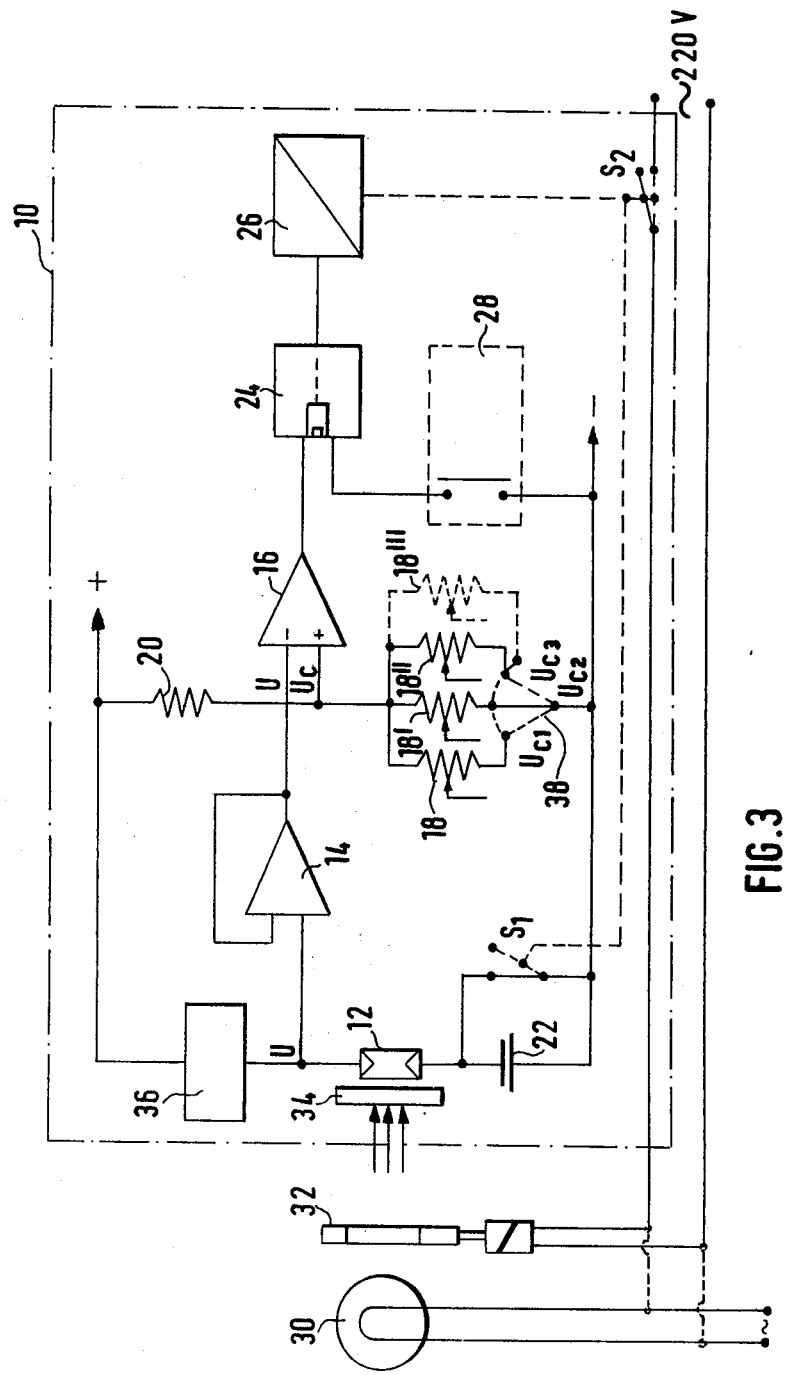
FIG. 3 is a schematic diagram illustrating the basic setup of the device according to the invention.

In FIG. 3 the source of light 30 serves to expose a material, such as a printing plate, which is not shown. A photosensitive element 12 is disposed in the light flux emitted by the source of light 30. This photosensitive element is a photoresistor with an ohmic resistance inversely proportional to the light intensity or the light flux of the source of light 30. A diaphragm 32 and a filter 34 are disposed in the beam path between the source of light 30 and the photoresistor 12. The filter 34 matches the light spectrum of the source of light 30 to the spectral sensitivity of the photosensitive material. Prior to the photoresistor 12, a capacitor 22 is incorporated in the circuit and forms an RC-element together with the ohmic resistance of the photosensitive element 12. The capacitor 22 is bridged by a switch $S_1$ which is opened when exposure commences, i.e., upon switching on the source of light 30, so that the capacitor 22 is charged.

The following equation generally applies to the potential gradient U at the capacitor:

$$U = U_0 \left(1 - e^{-\frac{t}{RC}}\right) \quad (1)$$

where C is the capacitance of a capacitor, $U_o$ is the voltage of a power source and R is the ohmic resistance.

When comparing the voltage U to a given voltage $U_1$ by means of a comparing unit, the period after which the two voltages become equal is given by:

$$T = -RC \cdot \ln\left(1 - \frac{U_1}{U_0}\right) \quad (2)$$

Assuming that the resistance R in equation (2) is inversely proportional to the light intensity of a source of light to which a material is exposed, so that $$R = \frac{a}{I} \quad (3)$$

then $$T \cdot I = -a \cdot C \cdot \ln\left(1 - \frac{U_1}{U_0}\right) = \text{constant.} \quad (4)$$

The RC element comprising the capacitor 22 and the photosensitive element 12 of the light dosing device 10 operates on this principle.

As soon as the source of light 30 is switched on, charging of the capacitor 22 begins and voltage at the capacitor is correspondingly amplified in the amplifier 14 and is adapted to the input of the comparing unit 16 in respect of impedance. This is necessary, because the resistance of the photosensitive element 12 ranges between about 100 K$\Omega$ and 1 M$\Omega$. In the comparing unit 16, the voltage U is compared to a given reference voltage Uc applied to the pick-up of a voltage divider comprising one of the set-point devices 18, 18', 18''... and the resistor 20. The set-point devices 18, 18', 18''... are potentiometers which are preset according to the exposure characteristics of the material to be exposed. A rotary switch 38 connects the chosen set-point device to the base connection of the light dosing device 10. A reference voltage $Uc_1$, $Uc_2$, $Uc_3$... etc. corresponds to each of the set-point devices 18, 18', 18''.... The output voltage of the comparing unit 16 serves as one of the input voltages of a flip-flop circuit 24, the second input of which receives a starting pulse from a starting element 28 when the light dosing device 10 is switched on. The flip-flop circuit 24 may, e.g., comprise a bistable multi-vibrator or a two-point circuit, using the output voltage of the comparing unit 16 and the starting pulse from the starting element 28 as the switching voltages for its two stable positions. The flip-flop circuit 24 is connected to a relay member 26 which opens or closes the two switches $S_1$ and $S_2$ depending on the stable position adopted by the flip-flop circuit 24. The switch $S_2$ is in the circuit of the diaphragm 32 which is positioned between the source of light 30 and the photosensitive element 12, as shown in FIG. 3. The switch $S_2$ may just as well be disposed in the circuit of the source of light 30 for switching on and off the source of light. If so, it is not necessary to actuate the diaphragm 32, which then only serves to collimate the rays emitted by the source of light 30. Both positions of the switch $S_2$ are shown in FIG. 3.

In addition, the light dosing device 10 includes a triggered switching element 36, e.g. described in the German language "TTL-Kochbuch", page 109, published by Texas Instruments Deutschland GmbH, 805 Freising. This triggered switching element 36 allows a change of exposure times of the material in a given ratio according to the desired shade of gray. By means of the triggered switching element, the exposure times may, e.g., be extended by an even multiple of $\sqrt{2}$. Then, charging of the capacitor 22 is discontinuous and the delay times between the individual charging processes are rated to meet the above-described requirement. The switching element 36 is disposed in the circuit of the light dosing device 10 and is connected to one input of the amplifier 14 which is linked up with the photosensitive element 12.

The light dosing device operates as follows:

When the copying machine is switched on, a starting pulse is released in the starting element 28 which triggers the flip-flop circuit 24 and causes it to adopt one of its two stable positions. As a result, the relay member 26 picks up and opens the switch $S_1$ and closes the switch $S_2$, so that the switches adopt the positions shown by dotted lines in FIG. 3. By closing the switch $S_2$ the source of light 30 is switched on and the element 12 is acted upon by the light flux. As a result, the capacitor 22 is charged in accordance with the intensity of the light impinging upon the exposed material.

In another embodiment of the invention, not shown in the drawings, the source of light 30 is constantly energized, but is operating, however, at reduced capacity while the device is in the rest position. Power is only stepped up to full capacity when the light dosing device is switched on. This is particularly advantageous when radiation sources, such as quartz or UV lamps, are used which normally require a warming-up period. With the above method of operation, a warming-up period is no longer necessary and the lamps can operate at full capacity immediately following switching-on of the device. In this case, the second switch $S_2$ actuates the diaphragm 32 only, which opens when the second switch is closed so that light from the source of light 30 fully impinges upon the element 12. The output voltage of the element 12 is amplified in the amplifier 14, and at the same time it is adapted to the input of the comparing unit 16 in respect of impedance. The second input of the comparing unit is supplied with the reference voltage Uc via one of the set-point devices 18, 18', 18" .... As soon as the voltage U and the reference voltage Uc become equal, the flip-flop circuit 24 changes to its second stable position and actuates the relay member 26 which closes the first switch $S_1$ and opens the second switch $S_2$. By closing the first switch $S_1$ the capacitor 22 is discharged, and by opening the second switch $S_2$ the power supply to the source of light 30 is stopped or the diaphragm 32 is closed, so that the element 12 is no longer struck by light.

The triggered switching element 36 allows a stepwise change in the shade of gray measured by means of gray wedges on the material to be exposed. For this purpose, the exposure time is, e.g., progressively extended by a factor of $\sqrt{2}$. When the shade of gray is to be deepened by a given factor, the triggered switching element 36 is advanced by one stage. Since the structure and operation of the triggered switching element 36 are well known to those of ordinary skill in the art, the element will not be explained in detail.

It is the object of the light dosing device to invariably yield proper exposure of the photosensitive material, i.e., exposure in accordance with the exposure characteristics of the material, irrespective of of influences such as aging of the source of light or variations in intensity during exposure. This aim is achieved by adapting the product T. I (equation 4) of the light dosing device 10 to the photosensitivity of the material to be exposed, by adequately choosing the capacity C of the capacitor 22, the voltage U at the output of the element 12 and the reference voltage Uc. When another photosensitive material with characteristics differing from those of the first material is to be exposed, it is necessary only to change the reference voltage Uc in the light dosing device, following an empirical determination of the exposure characteristics of the material.

What is claimed is:

1. A device for dosing light from a light source in accordance with the intensity of light impinging upon a material to be exposed, comprising:

a photoresistor located in the beam path of the light source and controlling the exposure time in accordance with the intensity of the light impinging upon the material;

a capacitor bridged by a first switch and starting to be charged when the light source is switched on;

said photoresistor having an ohmic resistance inversely proportional to the intensity of the light impinging thereon and providing an output voltage, said photoresistor stationarily arranged in the beam path of said light source and, together with the capacitor, connected in series to form an RC-circuit;

a switching element for varying the exposure times and connected in series with the photoresistor;

amplifying means having an input and providing an amplified output voltage;

means for connecting the juncture of said photoresistor and said switching element to the input of said amplifying means;

said switching element being triggered with an adjustable frequency and/or pulse width discontinously extending the period of time during which the capacitor is charged by exposure;

means responsive to switching-on of the light source for initiating charging of the capacitor;

means for comparing the amplified output voltage of said photoresistor with a reference voltage and producing an output signal when said amplified output voltage is equal to said reference voltage; and means for controlling the length of time for which the light of the light source is impinging upon the material, said means including a diaphragm positioned between the light source and the material to be exposed and means for opening and closing said diaphragm in response to said output signal from said comparing means;

whereby the exposure times of said material to be exposed can be varied by a predetermined ratio to produce a desired shade of gray.

2. The light dosing device as defined by claim 1, wherein said charging initiating means comprises means for opening the first switch responsive to switching-on of the light source; and said device further includes a voltage divider connected to said comparing means for providing said reference voltage.

3. The light dosing device as defined by claim 2, wherein said voltage divider comprises a plurality of potentiometric set-point devices which are adjustable in accordance with the exposure characteristics of the material to be exposed, a resistor and switching means for selectively and individually connecting said set-point devices to said resistor to form said voltage divider, a tap of said voltage divider being connected to one input of the comparing means, while an output of the amplifying means is connected to another input of the comparing means.

4. The light dosing device as defined by claim 2, wherein said controlling means comprises a flip-flop circuit adapted to receive the output signal of said comparing means as the switching voltage for one of two stable positions thereof and means for providing to said flip-flop circuit a starting pulse as the switching voltage for the other of the two stable positions of the flip-flop circuit.

* * * * *